(12) United States Patent
Tzschentke et al.

(10) Patent No.: US 8,080,918 B2
(45) Date of Patent: Dec. 20, 2011

(54) APPARATUS AND METHOD FOR CONTROLLING THE MACHINING OF WORKPIECES USING PIEZOCERAMIC TRANSDUCERS

(75) Inventors: Konrad Tzschentke, Pommelsbrunn (DE); Hans-Jürgen Schreiner, Neunkirchen am Sand-Rollhofen (DE); Kurt Handschuh, Eckental (DE); Raouf Ben Amor, Lorch (DE); Michael Fripan, Backnang (DE)

(73) Assignee: Ceramtec GmbH, Plochingen (DE)

( * ) Notice: Subject to any disclaimer, the term of this patent is extended or adjusted under 35 U.S.C. 154(b) by 588 days.

(21) Appl. No.: 12/161,421

(22) PCT Filed: Feb. 2, 2007

(86) PCT No.: PCT/EP2007/051026
§ 371 (c)(1),
(2), (4) Date: Nov. 12, 2008

(87) PCT Pub. No.: WO2007/088198
PCT Pub. Date: Aug. 9, 2007

(65) Prior Publication Data
US 2009/0165621 A1    Jul. 2, 2009

(30) Foreign Application Priority Data

| Feb. 3, 2006 | (DE) | 10 2006 005 483 |
| Jul. 7, 2006 | (DE) | 10 2006 031 843 |
| Jan. 29, 2007 | (DE) | 10 2007 005 222 |

(51) Int. Cl.
*H01L 41/08* (2006.01)
(52) U.S. Cl. ........................................ 310/328; 310/321
(58) Field of Classification Search .................. 310/328, 310/338, 339
See application file for complete search history.

(56) References Cited

U.S. PATENT DOCUMENTS

| 6,586,862 | B1 | 7/2003 | Cselle |
| 7,685,733 | B2 * | 3/2010 | Ohmori et al. ................. 33/559 |
| 7,710,287 | B2 * | 5/2010 | Lange et al. ................. 340/680 |
| 2004/0067116 | A1 | 4/2004 | Feist |
| 2005/0109174 | A1 | 5/2005 | Claesson et al. |
| 2005/0262975 | A1 | 12/2005 | Lundblad |
| 2007/0056414 | A1 | 3/2007 | Saeterbo et al. |

FOREIGN PATENT DOCUMENTS

| DE | 196 32 148 A1 | 2/1998 |
| DE | 199 25 193 A1 | 10/2000 |
| DE | 100 44 592 C1 | 2/2002 |
| DE | 102 29 134 A1 | 1/2004 |
| DE | 103 12 025 A1 | 10/2004 |
| WO | WO 2005/042195 A | 5/2005 |
| WO | WO 2005/063437 A | 7/2005 |

* cited by examiner

*Primary Examiner* — Mark Budd
(74) *Attorney, Agent, or Firm* — Fulbright & Jaworski L.L.P.

(57) ABSTRACT

Patterns detection to input data containing a plurality of transactions, each transaction having at least one item, is carried out in the following way. Filter conditions for interesting patterns are received, and a first wet of filter conditions applicable in connection with generation of candidate patterns is determined.

13 Claims, 4 Drawing Sheets

APPARATUS AND METHOD FOR CONTROLLING THE MACHINING OF WORKPIECES USING PIEZOCERAMIC TRANSDUCERS

This application is a §371 of PCT/EP2007/051026 filed Feb. 2, 2007 which claims priority from DE 10 2006 005 483.0 filed Feb. 3, 2006, DE 10 2006 031 843.9 filed Jul. 7, 2006 and DE 10 2007 005 222.9 filed Jan. 29, 2007.

The invention relates to the use of piezoceramic transducers for controlling the machining of workpieces.

Material-removing cutting tools such as lathe chisels or planing tools generally consist of a carrier or shaft to which the cutting element in the form of a cutting plate is fastened. In the case of milling tools, because of the rotation of these tools, the carrier, the milling head, is round and is fitted with a multiplicity of cutting elements on the circumference. During the machining of workpieces, in particular dynamic loads act on the cutting tools in addition to the static loads. As a result, in the course of time the material on the cutting edges of the cutting elements is shattered in microscopically small areas. If these areas are added together to form macroscopically large areas, this leads to chipping at the cutting edges and even to destruction of the cutting element, with the possible consequence that the workpiece is damaged and thus becomes unusable.

The cutting force which acts between workpiece and cutting tool during the machining process can be divided into forces in the working plane and forces perpendicular to the working plane. In both planes compressive forces, which are transmitted as compressive forces to the carrier, act on the cutting edge of the cutting element. In the case of lathe chisels and planing tools, bending and torsional forces are thereby produced in the carrier of the cutting elements, leading, upon exceeding of a given value, to deviation of the cutting element from its ideal working position. This can cause malfunctions in the work process which are reflected in increased wear of the cutting element and irregular running of the lathe spindle or of the plane slide. In the case of milling machines, too, these phenomena occur in the event of bending forces on the drive shaft of the milling head. In the most unfavourable case chatter phenomena occur, leading to an uneven, undulating surface of the workpiece and imposing severe stress on a machine tool, especially if resonance occurs.

The cutting force thus causes a complex loading, and therefore deformation, of machine tool and workpiece which, if limit values are exceeded, leads to increased wear of the cutting element and, in the most unfavourable case, to its destruction. In addition, damage to the machine tool and machining errors on the workpiece can result from overloading.

In order to achieve optimum working results, therefore, it is necessary to coordinate in particular the parameters of cutting speed, feed rate and feed engagement optimally with the material to be machined, in dependence on the material of the cutting element. In order that the limit values of possible loadings are not exceeded, it is therefore advantageous if the forces arising are measured and monitored.

A method for compensating errors of position control of a machine, in particular a machine tool, is known from DE 103 12 025 A1. The stress conditions at various locations of the machine are measured by means of strain gauges and the inertia forces resulting from the machining forces or movements, or the deformations resulting from the weight of the cross slide and of the tool are calculated and compensated in the position control system. However, strain gauges are unsuited to measuring intrinsically rotating parts such as milling heads. In addition, because of their inertia, strain gauges are not suited to measuring deformations resulting from high-frequency oscillations of the kind which occur during the machining of workpieces.

A method and an apparatus for controlling oscillations in a machine tool for machining workpieces is described in the patent application US 2005/0109174 A1. At least one oscillation sensor and an actuator with an active element, each in the form of a piezo element, are arranged in a tool holder of the machine tool. The signals of the oscillation sensor are utilised to apply an alternating voltage as a control voltage to the active element of the actuator, such that control oscillations are generated by the changes in the dimensions of the active element which are directed oppositely to the oscillations generated by machining of the workpiece. In this case, the signal of the oscillation sensor acts directly on another piezo element, which acts on the tool holder in order to eliminate the interfering oscillations.

A tool holder with electrostrictive actuator bodies used to influence the concentric behaviour of the tool holder is known from the PCT publication WO 2005/063437 A1. The tool holder is deformable by the actuator bodies in a specified manner, so that the mass of the tool holder, including the tool clamped therein, is distributed, in a deformed state of the actuator body, as symmetrically as possible around the ideal axis of rotation. For this purpose an appropriate electrical potential is applied to the actuator bodies by means of a signal of a piezo-element sensor.

It is the object of the invention to equip the cutting tools of machine tools for machining workpieces with sensors in such a way that the forces arising during machining of a workpiece can be determined and compared to limit values, so that the machining process can be optimised and, if the limit values are exceeded, intervention in the work process can be effected by a control device and by means of actuators in order to prevent damage.

This object is achieved according to the invention with regard to the apparatus by means of the characterising features of claim 1, and with regard to the method by means of the characterising features of claim 7. Advantageous configurations of the invention are claimed in the dependent claims.

According to the invention, material-removing cutting tools are equipped with piezoceramic transducers in the form of sensors and/or pure voltage generators. The structure and operation of these transducers is known from the state of the art and therefore is not explained in detail here. According to the invention, the piezoceramic transducers are arranged in such a way that the function they have to perform in each case is performed optimally. The sensors and voltage generators may be used in direct contact with the cutting element in the carrier or milling head. In the case of lathe chisels and planing tools, the sensors and voltage generators may also be arranged at locations where the respective carrier is attached to the machine tool, between tool holder and cutting tool. In the case of milling machines, transducers may also be arranged where the shaft of the milling cutter is mounted in bearings. A combination of both arrangements is also possible.

As a result of the fixing of the cutting element and the clamping of the carrier of the cutting tool in the tool holder, the piezoceramic transducers are already under a certain pressure. In order to obtain reproducible signals from the transducers it is necessary to check the preload on the transducers after each change of cutting element or carrier and to adjust the measuring devices accordingly.

With piezoceramic sensors the compressive, tensile and shear forces exerted on the cutting element or its holder are ascertained. The degree of loading in each case can be determined using the piezo-voltage generated. Voltage generators are deformed as a result of the forces acting on them and thereby generate an electric voltage. This voltage can be utilised to supply electronic circuits which, during milling for example, are used for contactless transmission of signals between the cutting tool and the machine tool.

In order to be able to determine the stresses on cutting tool and machine tool, the cutting force is resolved into its components. For this purpose a three-dimensional coordinate system is produced, with its zero point at the point of contact between the cutting edge of the cutting element and the workpiece, the axes lying in the working plane and in the plane perpendicular thereto. The cutting force is resolved into components lying in these two planes, as can be seen from FIGS. 1 and 2. In those figures the forces are plotted as they act on the cutting element or the carrier. The cutting force F acts on the lathe chisel or the milling cutter in the direction $-F$. The passive force $-F_p$ acting in the direction of the carrier loads the cutting element, and therefore the carrier and the tool holder, in compression. The active force $-F_a$ can be resolved into the feeding force $-F_f$ and the cutting force $-F_c$. The feeding force $-F_f$ disposed in the longitudinal direction of the workpiece and the cutting force $-F_c$ disposed perpendicularly thereto each exert a bending force on the carrier, the sum of these forces leading in the turning machine to a torsion of the carrier and in a milling machine to bending of the drive shaft of the milling cutter. In order to capture the force components, therefore, at least three transducers in the form of sensors are required. In order to capture the forces in a turning machine, the sensors must be arranged below the cutting element or the carrier and, viewed in the feed direction $V_f$, in front of the cutting element or the carrier in the tool holder, and, viewed in the direction towards the workpiece, in front of the cutting element or carrier. In the case of a milling machine, the sensors are arranged below and behind the cutting elements in the milling head, and in the bearings of the drive shaft of the milling head to capture the bending forces on the shaft.

The transducers used for capturing the forces arising during machining of workpieces generate a voltage because of the constant change in the value of the forces acting on them, which voltage is continuously compared in the machine tool with predefined limit values in the evaluation unit of a computer. With known wear behaviour of the cutting elements, the forces acting on the cutting element can be limited to values which enable optimum wear behaviour by adjusting the parameters of rotational speed of the workpiece or cutting tool, feed velocity and feed engagement, i.e. cutting depth. If impermissible deviations occur the malfunction can be corrected by intervention in the work process. In the case of turning, the rotational speed of the workpiece and the feed rate and engagement of the cutting tool can be changed and, in the case of planing, feed rate and engagement can be changed. In the case of milling, as a rule the rotational speed of the milling head and/or, depending on machine type, the feed rate of workpiece or milling head are changed. The occurrence of chatter phenomena, which manifest themselves in a periodic change in the rotational speed of the workpiece or the milling head and in periodic oscillation of the carrier and even of the workpiece, is prevented by changes of rotational speed and/or of feed rate. These measures contribute advantageously to a considerable increase in the durability, and therefore prolongation of the service life, of the cutting tools and to improved quality of the surface machined.

The invention also makes it possible to monitor wear of the cutting elements. With increasing wear, and with constant feed rate and constant rotational speed of the workpiece, the cutting force changes continuously. If a previously determined limit value characteristic of the cutting element is reached, it can be assumed that the usable part of the cutting element is exhausted and a change must be carried out. The invention therefore advantageously makes possible the best possible utilisation of cutting elements. Because the service life of the cutting elements can be calculated in advance, it is possible to plan a timely change, which optimally can be integrated in the process sequence, for example at the time of changing a workpiece.

If the cutting edge is damaged or the cutting element is even fractured, this is manifested in an abrupt change in the cutting force. Such a signal can be used to switch off the machine tool immediately in order to prevent damage to the workpiece.

In particular in the case of milling machines, where transmission of signals from the rotating milling head to the control system of the machine tool, and inversely, is difficult, wireless transmission of the signals is advantageous. The voltage supply of the transmitter and, if applicable, of the receiver on the milling head can be generated by piezo elements which, additionally to the existing sensors, are arranged beside or below them at the same location.

Through monitoring of the data on the condition of the cutting element and of the forces acting on the cutting elements and their carriers, and therefore on the machine tool, it becomes possible to prevent overloads and oscillations, in particular chatter phenomena. This leads to more stable machining processes, which in turn make possible superior workpiece qualities and longer service life of the cutting elements.

The invention is explained in more detail with reference to exemplary embodiments. In the drawings.

Figure 1:
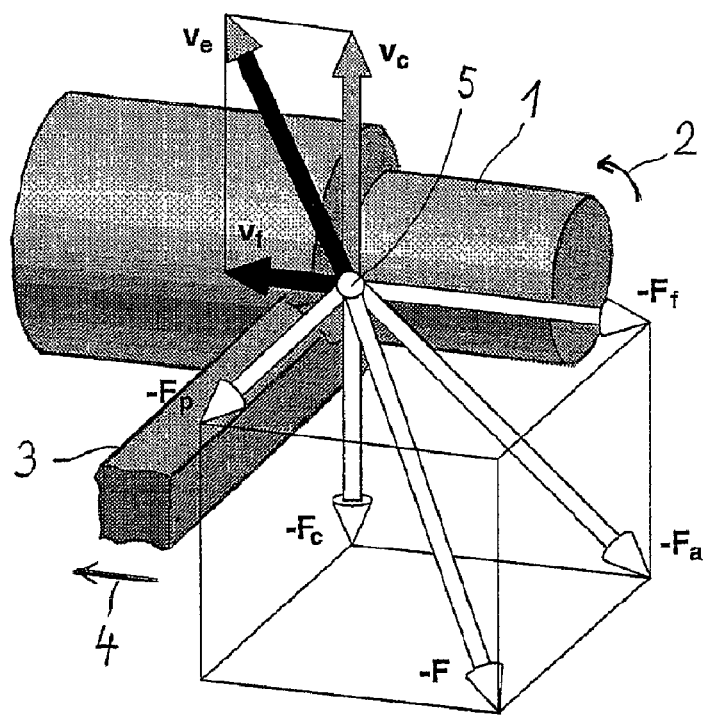
FIG. 1 shows in a schematic diagram the disposition of the force vectors and velocity vectors which occur during turning and FIG. 2 during conventional milling.

FIG. 1 shows the disposition of the forces and velocities occurring during longitudinal turning. For machining, a cutting tool 3 is guided in the arrow direction 4 along a workpiece 1 which is rotating in the arrow direction 2. The zero point 5 of a three-dimensional coordinate system is located at the cutting corner of the cutting element. The feed direction lies in the plane of the system in which the workpiece 1 lies and the engagement of the cutting tool 3 is effected in the plane perpendicular thereto. The movements during the machining process, when turning, planing and milling, are relative movements between the cutting edge of the cutting element and the workpiece. They are generated by the machine tool at the point of application, here point 5, and relate to the workpiece at rest. The main cutting edge moves along the workpiece 1 at working velocity $V_e$, while the cutting force $-F$ acts on the cutting element and therefore on the carrier and ultimately on the machine tool.

As already described, the cutting force $-F$ can be resolved into forces in the working plane and forces perpendicular to the working plane. The active force $-F_a$, which is a determining factor for calculating the material-removing capacity, lies in the working plane, and the passive force $-F_p$, which does not contribute to the material-removing capacity but which loads the cutting element, and therefore the cutting tool 3 and ultimately the machine tool, in compression, is disposed perpendicularly to the working plane. The active force $-F_a$ can, according to the feed and cutting direction in the working plane, be resolved into the components cutting force $-F_c$ and feed force $-F_f$, which act as bending or torsional forces on the cutting tool 3.

Figure 2:
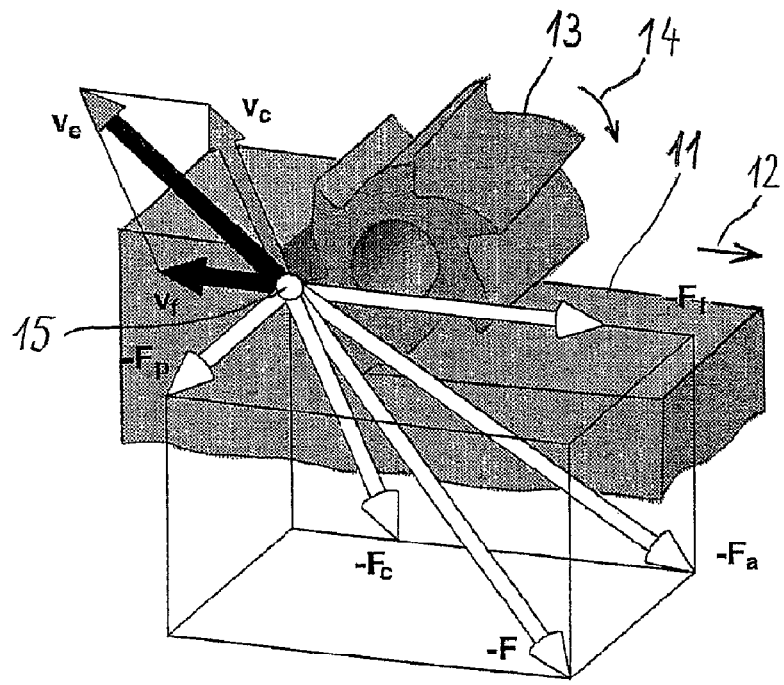

In the machining process of conventional milling represented in FIG. 2, the same forces arise as in the longitudinal turning represented in FIG. 1, and in planing. However, the difference is that a cutting element of a milling cutter is in engagement with the workpiece over half of the circumference of the milling cutter, and that the coordinate system shown here reproduces the distribution of forces only at one point of engagement. In conventional milling the workpiece 11 moves in the arrow direction 12 below the positionally fixed cutting tool, a cylindrical cutter 13 rotating in the arrow direction 14. The centre 15 of the coordinate system for resolving the cutting force $-F$ at this point lies at one of the points of engagement of the cutting edge of the cutting element.

The voltages generated in the sensors during the machining process are a measure of the instantaneous loadings on the cutting elements and the machine tool. If predefined limit values are exceeded an intervention is made in the control system of the machine tool, the feed rate and/or rotational speed, for example, being changed.

Figure 3:
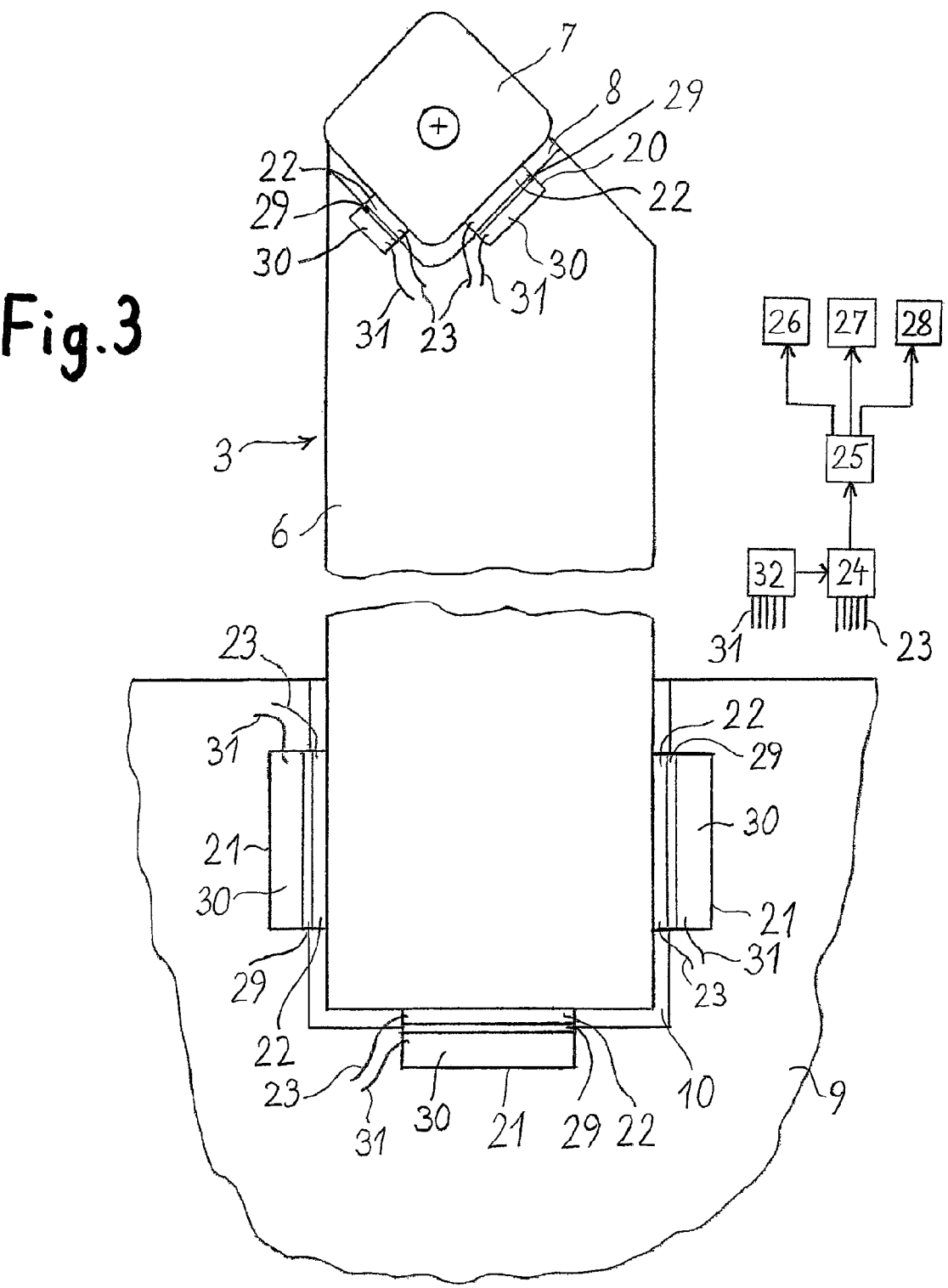
FIG. 3 shows the arrangement of transducers on the cutting element and in the region of the clamping of the carrier in a side view and FIG. 4 in a top view.
Figure 4:
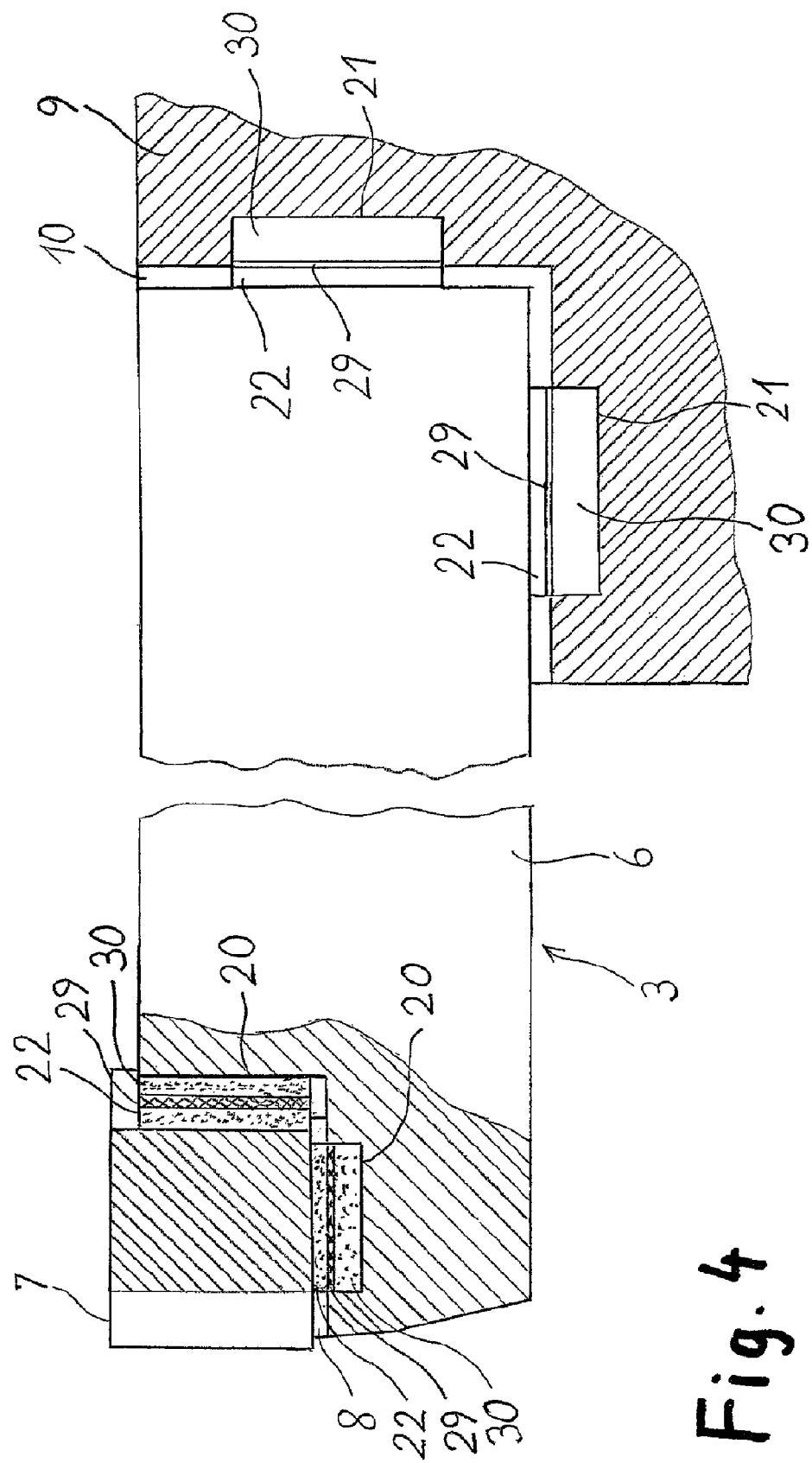

FIGS. 3 and 4 show a cutting tool 3, a lathe chisel, equipped with piezoceramic transducers according to the invention. The representation is schematic. FIG. 3 shows a top view of the cutting tool. On the carrier 6 a cutting element 7 in the form of a cutting plate is fastened, in a manner not represented in detail here, in a recess 8 of the carrier 6. The carrier 6 is in turn fastened in a tool holder 9 in a recess 10. The fastening is effected in such a manner that a controlled movement with respect to the tool holder 9 is possible.

In the present exemplary embodiment, transducers supported in openings 20, 21 are arranged both between the cutting element 7 and the carrier 6 and between the carrier 6 and the tool holder 9. In addition to the forces acting on the cutting element, the forces acting on the machine tool can also be determined. Because of the small amount of space available for installing the transducers, it is advantageous to arrange them one above the other.

Sensors 22 which are provided to determine the forces acting on the cutting element 7 and the tool holder 9, and therefore on the machine tool, are positioned first against the cutting element 7 and the carrier 6. Because the sensors are used for signal generation, single-layer piezo elements can be used in order to keep the constructional changes as small as possible. The voltages generated in these sensors by the action of forces are conducted as signals 23 first to a signal-receiving and trigger circuit 24. There the signals are checked for exceeding of limit values and, in the event of overshooting or undershooting of a predetermined force on the cutting element 7 or on the carrier 6 in the tool holder 9, a signal is transmitted to the control device 25 of the machine tool. The control device 25 can intervene in the operating process of the machine tool and change its drive 26, i.e. rotational speed, feed rate 27 and/or feed engagement 28. A block diagram clarifies the signal processing.

Transducers in the form of voltage generators 30 may be arranged between the sensors 22 and the carrier 6, the transducers being separated from one another by an insulating support plate 29. Unlike the case with the sensors, multi-layer elements are advantageous here. The voltage 31 generated in them by the changing action of forces is transmitted to a rectifier unit 32 and can be utilised to supply electronic circuits, for example in the signal-receiving and trigger circuit 24.

A side view of the lathe chisel from FIG. 3 is shown in FIG. 4. Functional elements of the same type are therefore designated by the same reference numerals as in FIG. 3. The fixing elements of the cutting element and of the lathe chisel are omitted here for clarity. The carrier 6 is cut away in the region of the cutting element 7 and of the clamping in the tool holder 9, in order to show the possible arrangement of the transducers below the cutting element and below the carrier in the tool holder. The transducers and the support plate are shown cutaway in the region of the cutting element. Through the arrangement of the transducers below cutting element and carrier it is possible to determine the components of the cutting force which are applied perpendicularly to cutting element and carrier.

Figure 5:
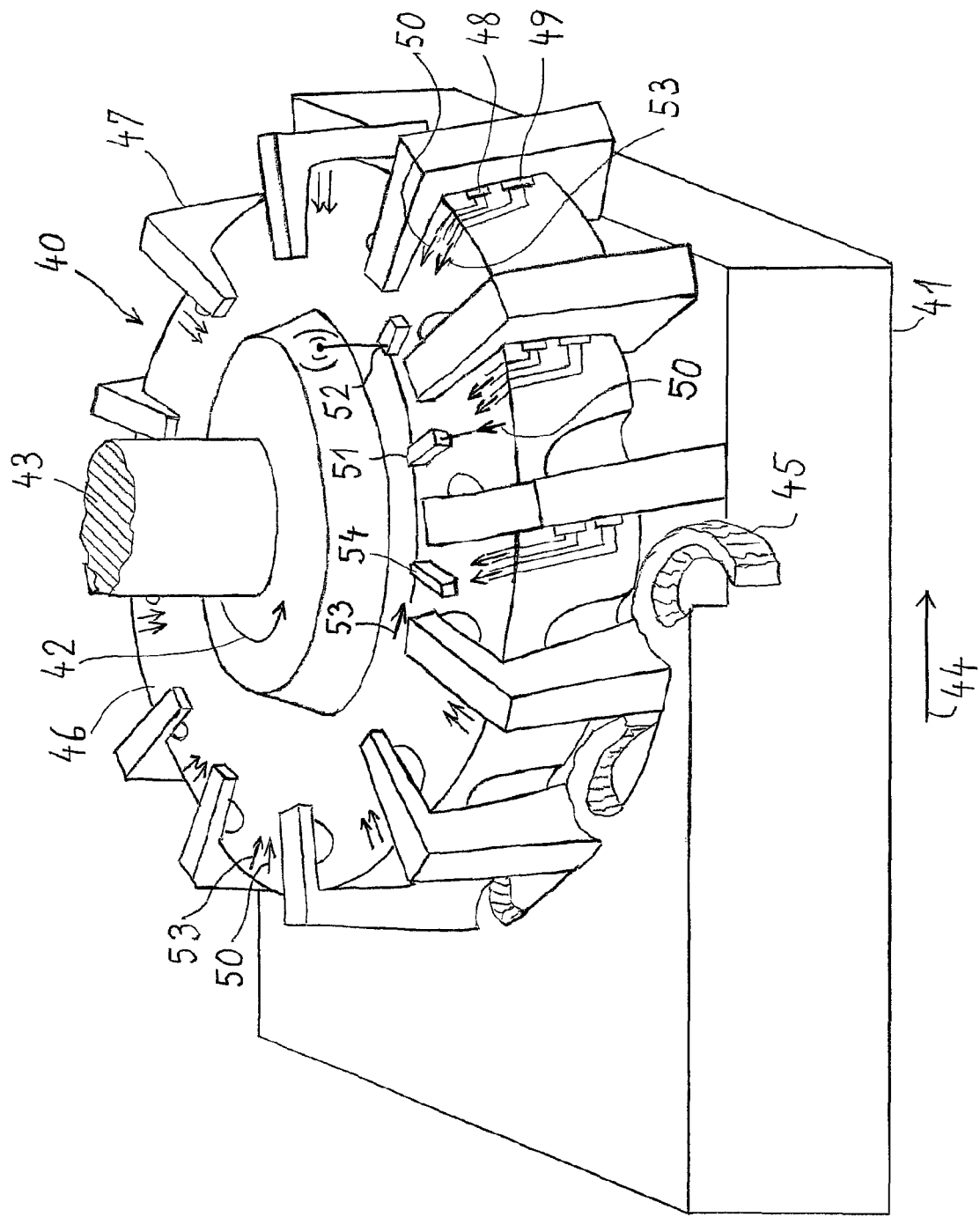
FIG. 5 shows the arrangement of transducers and of a signal-transmitting element on a face-milling cutter.

FIG. 5 shows a face-milling cutter 40 as the cutting tool during processing of a workpiece 41. Whereas the positionally-fixed milling cutter 40 rotates about its shaft 43 in the direction 42, the workpiece 41 is pulled through below the milling cutter in the direction 44, chips 45 being removed. The cutting elements 47 are arranged in the cutting head 46 at uniform intervals on the circumference. Viewed in the direction of rotation 42 of the milling cutter, transducers against which the cutting elements 47 bear are arranged in the cutting head 46 in front of the cutting elements 47. In the present exemplary embodiment the transducers are sensors 48 for determining the force acting on the cutting elements and the milling head, and voltage generators 49. In the present embodiment the transducers are arranged side-by-side. An arrangement one above the other, as shown for the exemplary embodiments in FIGS. 3 and 4, is also possible.

Because the milling cutter 40 rotates, signal transmission of the data acquired by the sensors to a control device of the machine tool is difficult. For this reason radio transmission from and to the milling head 46 to a transceiver on the machine tool (not shown here) is provided in the present exemplary embodiment. The voltages generated in the sensors 48 by the forces acting are transmitted as signals 50 first to a signal-receiving and trigger circuit 51. There the signals are checked for exceeding of limit values and, in the event of overshooting or undershooting of a predetermined force on a cutting element 47, a signal is transmitted to the control device of the machine tool. Signal transmission from the rotating milling cutter 40 to the machine tool is effected by means of a transmitter 52. The electrical energy 53 required for this purpose is generated in the transducers 49 configured as voltage generators and is supplied to a rectifier unit 54. The latter supplies the signal-receiving and trigger circuit 51 and a transmitter 52 with the required voltage.

The sensors may also be arranged, for example, on the circumference of the bearing or bearings of the shaft of the milling cutter in the machine tool. The forces acting on the machine tool can thereby be determined in a manner comparable to the determination of the forces on the tool holder of a turning machine.

The invention claimed is:

1. A material-removing cutting tool, comprising a carrier which carries at least one cutting element, the cutting tool being mounted in a tool holder or bearing of a machine tool and the machine tool being equipped with a device for controlling the machining of workpieces, wherein piezoceramic transducers are provided as sensors and optionally additionally as voltage generators and these transducers are arranged at least one location on the cutting tool or on its bearing arrangement in order to be impinged upon by at least one component of the cutting force which arises during the machining and acts on the cutting tool, wherein the transducers are connected to the control device of the machine tool and in that the signals generated in the sensors as a result of the action of forces and evaluated by the control device can be used for controlling at least one of the rotational speed of the drive of the workpiece or of the cutting tool, the feed rate or the feed engagement.

2. A material-removing cutting tool according to claim 1, wherein the piezoceramic transducers are arranged between the cutting element and the carrier of the cutting tool.

3. A material-removing cutting tool according to claim 1, wherein the piezoceramic transducers are arranged between the carrier of the cutting tool and the tool holder, or between the shaft of the cutting element and the bearing in the machine tool.

4. A material-removing cutting tool according to claim 2, wherein the piezoceramic transducers are arranged both between the cutting element and the carrier of the cutting tool and between the carrier of the cutting tool and the tool holder, or between the shaft of the cutting element and the bearing in the machine tool.

5. A material-removing cutting tool according to claim 1, wherein the sensors and the voltage generators are arranged one above the other between the cutting element and the carrier of the cutting tool, between the carrier of the cutting tool or the tool holder, or between the shaft of the cutting element and the bearing in the machine tool, optionally separated from one another by an insulating support plate.

6. A material-removing cutting tool according to claim 1, wherein the voltage generators are connected to the voltage supply via a rectifier unit with electronic circuits.

7. A method for controlling the machining of workpieces on machine tools with cutting tools which carry at least one cutting element on a carrier and are mounted in a tool holder or bearing of a machine tool, wherein the machining is controlled with a control device, wherein piezoceramic transducers are arranged as sensors and optionally additionally as voltage generators at least one location on the cutting tool or on its bearing arrangement, at which location at least one component of the cutting force arising during the machining acts on the cutting tool, and wherein at least one of the force components of the cutting force acts on the transducers, wherein the signals generated by the action of forces on the transducers are compared to predefined limit values, in that upon overshooting or undershooting of a limit value a signal is transmitted to the control device of the machine tool and wherein the control device changes at least one of the rotational speed of the workpiece, the cutting tool, the feed rate or the feed engagement in order to eliminate the deviation which has occurred.

8. A method according to claim 7, wherein at least one of the components of the cutting force acting on the cutting tool is determined, and in that a signal for changing the cutting elements is generated if a predefined limit value of the cutting force is exceeded.

9. A method according to claim 7, wherein at least one of the components of the cutting force acting on the cutting tool is determined with the sensors, in that the degree of loading of the cutting element and/or of the machine tool is inferred from the magnitude of the signal and in that the machine tool is switched off if a predefined limit value is exceeded.

10. A method according to claim 7, wherein the voltage generated with the voltage generators is used for supplying electronic circuits.

11. A method according to claim 7, wherein, in the case of rotating cutting tools, communication between the piezoceramic sensors on the cutting tool and the control device on the machine tool is effected by means of radio signals, the signals of the transducers being transmitted to a transmitting and receiving device on the cutting tool and from there to a receiver on the machine tool.

12. A material-removing cutting tool, consisting of a carrier which carries at least one cutting element, wherein the cutting tool is mounted in a tool holder or bearing of a machine tool, and the machine tool is equipped with a device for controlling the machining of workpieces, wherein a plurality of piezoceramic, transducers are provided as sensors, and these transducers are arranged at least one location on the cutting tool or on its bearing arrangement in order to be impinged upon by at least one of components $-F_a$, $F_f$ or $-F_r$ of the cutting force ($-F$) which arises during the machining and acts on the cutting tool, and the transducers are connected to the control device of the machine tool, characterized in that a plurality or piezoceramic transducers are provided as voltage generators for the voltage-supply of electronic circuits, and the piezoceramic transducers are arranged both between the cutting element and the carrier and between the carrier of the cutting tool and the tool holder and are supported in respective openings, and the sensors and the voltage generators are arranged one above the other, optionally separated from one another by an insulating support plate.

13. A material-removing cutting tool according to claim 12, wherein the voltage generators are connected to the electronic circuits for the voltage-supply via a rectifier unit.

\* \* \* \* \*